(12) United States Patent
Choi

(10) Patent No.: US 6,382,039 B1
(45) Date of Patent: May 7, 2002

(54) TELESCOPIC SYSTEM FOR A ROBOT

(75) Inventor: Yong-Won Choi, Yongin (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 16 days.

(21) Appl. No.: 09/629,854

(22) Filed: Aug. 1, 2000

(30) Foreign Application Priority Data

Jan. 28, 2000 (KR) .......................................... 2000-4266

(51) Int. Cl.[7] .......................... F16H 25/22; F16H 25/20
(52) U.S. Cl. .................. 74/89.35; 52/27.5; 108/147.19; 248/188.5; 254/102; 414/547
(58) Field of Search .................. 74/89.35; 52/27.5, 52/67, 118; 108/147.19; 248/326, 333, 188.5; 254/102; 414/547

(56) References Cited

U.S. PATENT DOCUMENTS

| | | | |
|---|---|---|---|
| 1,748,948 A | * | 3/1930 | Gassen ........................ 414/198 |
| 4,682,930 A | | 7/1987 | Hachisu |
| 4,752,102 A | * | 6/1988 | Rasmussen ............... 297/344.2 |
| 5,228,353 A | * | 7/1993 | Katahira et al. ............. 74/89.3 |
| 5,937,699 A | * | 8/1999 | Garrec ........................ 74/89.35 |
| 6,026,970 A | * | 2/2000 | Sturm, Jr. et al. .......... 212/348 |

FOREIGN PATENT DOCUMENTS

DE     2633022 B1    * 12/1977

* cited by examiner

Primary Examiner—Allan D. Herrmann
(74) Attorney, Agent, or Firm—Larson & Taylor PLC

(57) ABSTRACT

A telescopic system for a robot includes a frame for mounting a motor, a stationary module mounted on the frame and a rotational shaft rotating by the motor. The rotational shaft is mounted in the stationary module, and a movable plate is associated with the rotational shaft to ascend and descend according to a rotational motion of the rotational shaft. A movable module is mounted on the movable plate to expand away from and retract into the stationary module as the movable plate ascends and descends.

11 Claims, 4 Drawing Sheets

TELESCOPIC SYSTEM FOR A ROBOT

BACKGROUND OF THE INVENTION (a) Field of the Invention

The present invention relates to a robot and, more particularly, to a telescopic system for a robot that can obtain a predetermined stroke by providing a plurality of modules that are disposed to be movable with respect to one another.

(b) Description of the Related Art

U.S. Pat. No. 4,682,930 discloses a conventional telescopic system for a robot movable up and down. This will be described with reference to FIG. 1.

As shown in that drawing, a motor 6 is fixed in a stationary frame 1. A driving pulley 36 is fixed on a driving shaft of the motor 6. The driving pulley 36 is connected to a driven pulley 31 via a timing belt 32 so that the driven pulley 31 is rotatable relative to the stationary frame 1.

In addition, a spline shaft 33 is inserted into the driven pulley 31 such that it is movable in an axial direction but is not rotatable relative to the driven pulley 31. The spline shaft 33 is rotatably supported on an intermediate frame 7 through bearings.

Fixed on the stationary frame 7 is a first nut 4 to which a first screw 5 is coupled, the first screw 5 being designed to linearly move while rotating.

Coupled to the intermediate frame 7 through bearings is a second nut 8 which is rotatable but not movable linearly. Coupled to the second nut 8 is a second screw 9 which is linearly movable while rotating. The second screw 9 is rotatably supported on a movable frame 10.

In addition, pulleys 34, 11 and 12 are coupled to the spline shaft 33, the first screw 5, and the second screw 9, respectively. The pulleys 34, 11 and 12 are interconnected by a timing belt 35.

In the above described conventional telescopic system for a robot, the driving force of the motor 6 rotates the spline shaft 33 through the driving pulley 36, the timing belt 32 and the driven pulley 31. Rotational force of the spline shaft 33 rotates simultaneously both the first and second screws 5 and 9 through the pulleys 11 and 12 interconnected by the pulley 34 and the timing belt 35. Accordingly, the first and second screws 5 and 9 linearly move while undergoing rotation by the first and second nuts 4 and 8, thereby conveying a chuck 3 fixed on the movable frame 10 to a predetermined location.

A serious drawback of the above described conventional telescopic system is the complexity of the structure thereof That is, to move the intermediate frame 7 and the movable frame 10 up and down, the spline shaft 33 for transmitting the driving force of the motor 6 to the screws 5 and 9 and the pulleys 31 and 34 coupled to the spline shaft 33 must be specially provided, as do the nuts 4 and 8 and the screws 5 and 9. Therefore, when more than two stages of frames are expandably provided, the structure becomes that much more complicated, and a size and weight are increased. Particularly, during the operation of the system, a high load is applied to the stationary frame 1, deteriorating the reliability of the system.

SUMMARY OF THE INVENTION

The present invention has been made in an effort to solve the above problems.

It is an objective of the present invention to provide a telescopic system for a robot that can obtain a predetermined stroke by providing a plurality of modules that are disposed to be movable with respect to one another, yet have a simple structure.

To achieve the above objective, the present invention provides a telescopic system for a robot comprising a stationary module having a motor connected thereto, a rotational shaft rotated by a motor, the rotational shaft being mounted in the stationary module, a movable plate located in the stationary module and operatively associated with the rotational shaft to ascend and descend according to a direction of rotational motion of the rotational shaft, and a movable module mounted on the movable plate to extend away from and retract into the stationary module as the movable plate ascends and descends.

Preferably, the rotational shaft is provided with a spiral groove, and the movable plate has a screw nut associated with the spiral groove of the rotational shaft to ascend and descend as the rotational shaft rotates. The screw nut is provided at an inner circumference with a spiral groove corresponding to the spiral groove of the rotational shaft, and a plurality of balls are disposed within a space defined by the spiral groove of the screw nut and the spiral groove of the movable plate.

Further preferably, the stationary module comprises upper and lower plates, and the rotational shaft comprises an upper end rotatably supported on the upper plate of the stationary module and a lower end rotatably supported in a supporting body mounted on the lower plate of the stationary module. A plurality of vertical blocks are disposed between the upper and lower plates to support the upper plate, each block is provided with a projected rail, and the movable plate of the stationary module is provided with a guide groove associated with the rail such that the movable plate is guided by the projected rail when ascending and descending.

The motor comprises a driving shaft on which a driving pulley is mounted, and the rotational shaft comprises a driven pulley, the driving pulley and the driven pulley being interconnected by a belt.

A rotational force transmitting pulley is mounted on the rotational shaft of the stationary module such that the rotational force transmitting pulley ascends and descends together with the movable plate and rotates together with the rotational shaft. The movable module comprises a rotational shaft on which is mounted a rotational force receiving pulley connected to the rotational force transmitting pulley by a belt, and a movable plate mounted on the rotational shaft to ascend and descend as the rotational shaft of the movable module rotates. Finally, a sub-movable module is mounted on the movable plate of the movable module to expand away from and retract into the movable module as the movable plate of the movable module ascends and descends. The rotational shaft of the stationary module is provided with a linear groove associated with a spline nut supported on the movable plate of the stationary module, and the rotational force transmitting pulley is fixedly coupled to the spline nut.

The spline nut is provided with a ball receiving groove corresponding to the linear groove, and a plurality of balls are received in a space defined by the ball receiving groove and the linear groove.

Preferably, the movable module comprises an upper plate on which the rotational shaft of the movable module is rotatably supported, a plurality of blocks are disposed between the movable plate of the stationary module and the upper plate of the movable plate to support the upper plate of the movable module, each of the block is provided with a projected rail, and the movable plate of the movable module is provided with a guide groove associated with the rail such that the movable plate is guided by the projected rail when ascending and descending.

According to another aspect of the present invention, a telescopic system for a robot comprises a first stationary module, a motor associated with the first stationary module, a first rotational shaft in the first stationary module, and a first coupling means for coupling the motor to the first rotational shaft to rotate the first rotational shaft in the first stationary module. The system also includes a second movable module telescopically received in the first stationary module, a second rotational shaft in the second movable module, and a second coupling means (a) for coupling the first rotational shaft to the second movable module such that the second movable module and the second coupling means ascend and descend together according to a rotational direction of the first rotational shaft and (b) for coupling the rotational movement of the first rotational shaft to the second rotational shaft. The system then further comprises a third movable module telescopically received in the second movable module, and a third coupling means (a) for coupling the second rotational shaft to the third movable module such that the third movable module and the third coupling means ascend and descend together according to a rotational direction of the second rotational shaft.

In this other aspect of the invention, the second coupling means includes a rotational force transmitting pulley mounted for rotation with the first rotational shaft and for axial movement along the first rotational shaft, a rotational force receiving pulley mounted for rotation with the second rotational shaft, a belt interconnecting the force transmitting and receiving pulleys, and a movable member mounted for non-rotation on the first rotational shaft and connected to the second movable module so as to ascend and descend as the first rotational shaft is rotated and hence to similarly move the second movable module connected thereto.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENT

Reference will now be made in detail to the presently preferred embodiment of the invention, an example of which is illustrated in the accompanying drawings. Wherever possible, the same reference numbers will be used throughout the drawings to refer to the same or like parts.

Figure 1:
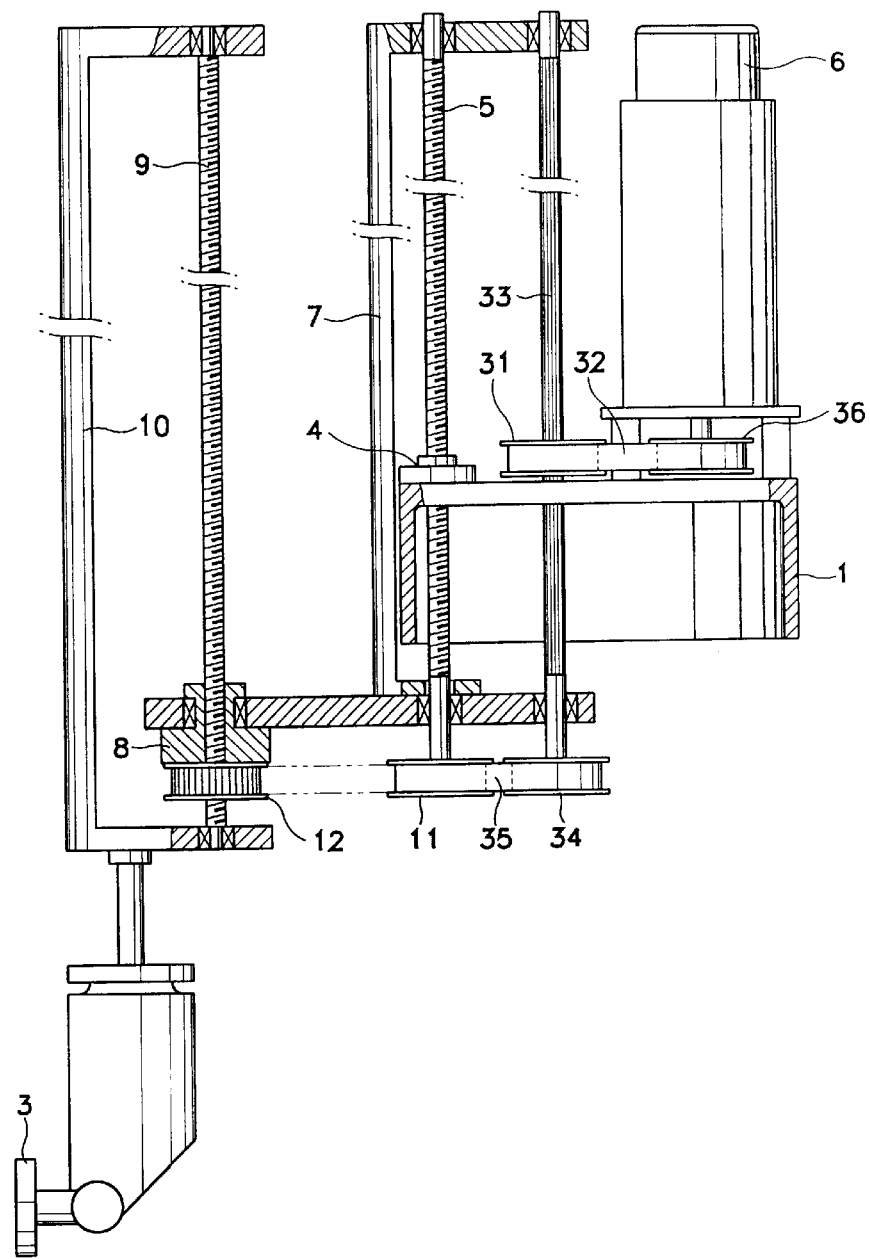
FIG. 1 is a front view of a conventional telescopic system for a robot.
Figure 2:
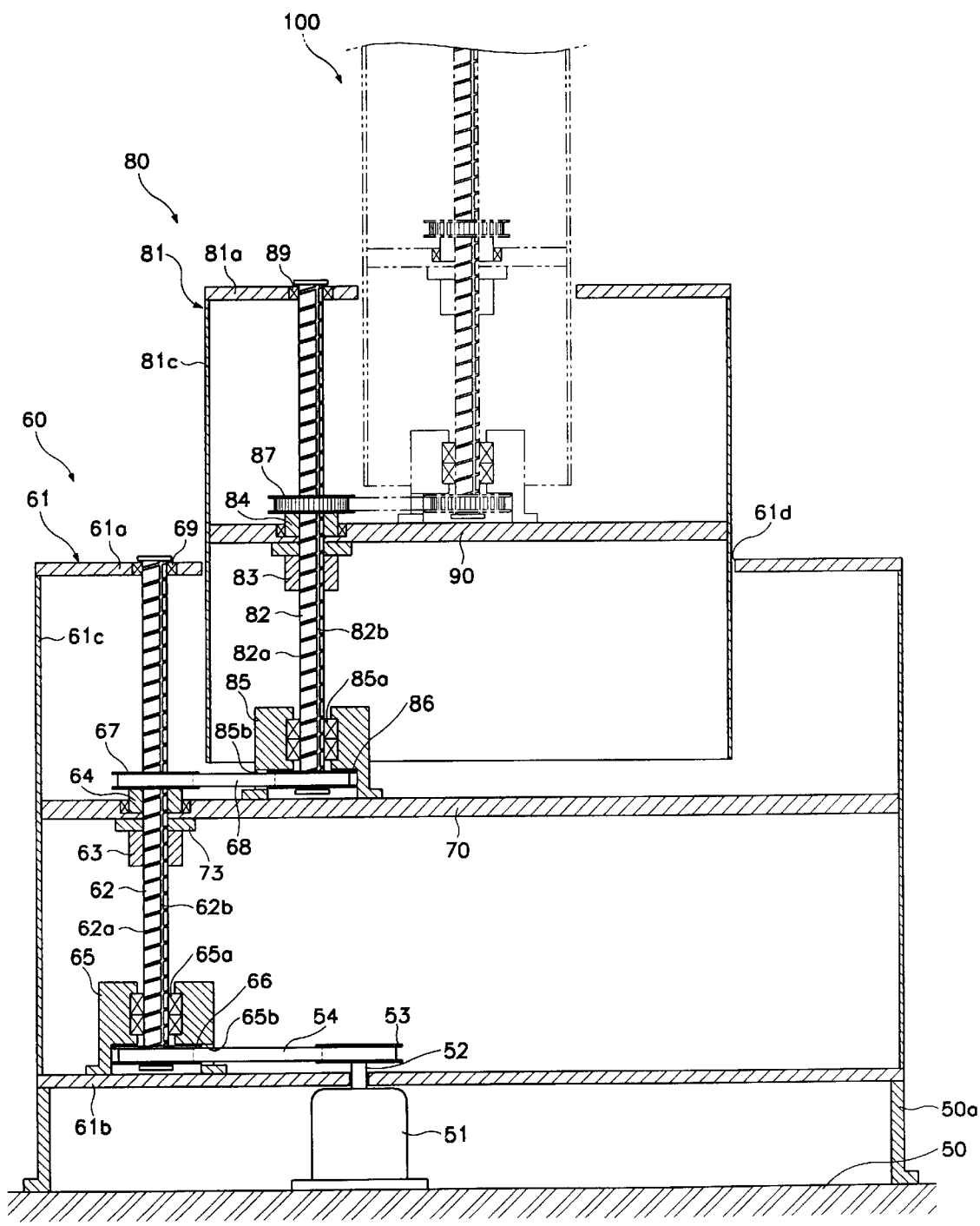
FIG. 2 is a sectional view of a telescopic system for a robot according to a preferred embodiment of the present invention.

FIG. 2 shows a telescopic system for a robot according to a preferred embodiment of the present invention.

As shown in the drawing, the inventive system includes a frame 50, a stationary module 60 mounted on the frame 50, and a first movable module expandably mounted on the stationary module 60.

The stationary module 60 comprises a lower plate 61b disposed on a top of a base tube 50a mounted on the frame 50 to define a space between the lower plate 61b and the frame 50 and an upper plate 61a disposed above and spaced away from the lower plate 61b. A cover functioning barrel 61c is disposed between the upper and lower plates 61a and 61b to define a case 61 with the upper and lower plates 61a and 61b.

A motor 51 is disposed in a space defined by the frame 50, the base tube 50a and the lower plate 61b, and a driving shaft 52 of the motor 51 penetrates and extends above the lower plate 61b of the stationary module 60. A driving pulley 53 is mounted on a front end of the driving shaft 52.

Disposed between the upper and lower plates 61a and 61b of the stationary module 60 is a movable plate 70 through which a rotational shaft 62 is coupled. The movable plate 70 ascends and descends along the rotational shaft 62 between the upper and lower plates 61a and 61b.

An upper end of the rotational shaft 62 is rotatably supported on the upper plate 61a by a bearing 69, while a lower end thereof is rotatably supported on a supporting body 65 by a bearing 65a. Mounted on an extreme lower end of the rotating shaft 62 is a driven pulley 66 connected to the driving pulley 53 of the driving shaft 52 of the motor 51 by a timing belt 54. The supporting body 65 is provided with a space 65b for receiving the driven pulley 66 and the timing belt 54.

In addition, a spiral groove 62a is formed along an outer circumference of the rotational shaft 62, and a linear groove 62b is formed going across the spiral groove 62a in an axial direction of the rotational shaft 62. The movable plate 70 is provided with a screw nut 63 screw-coupled to the spiral groove 62a and a spline nut 64 splined to the linear groove 62b.

Figure 3:
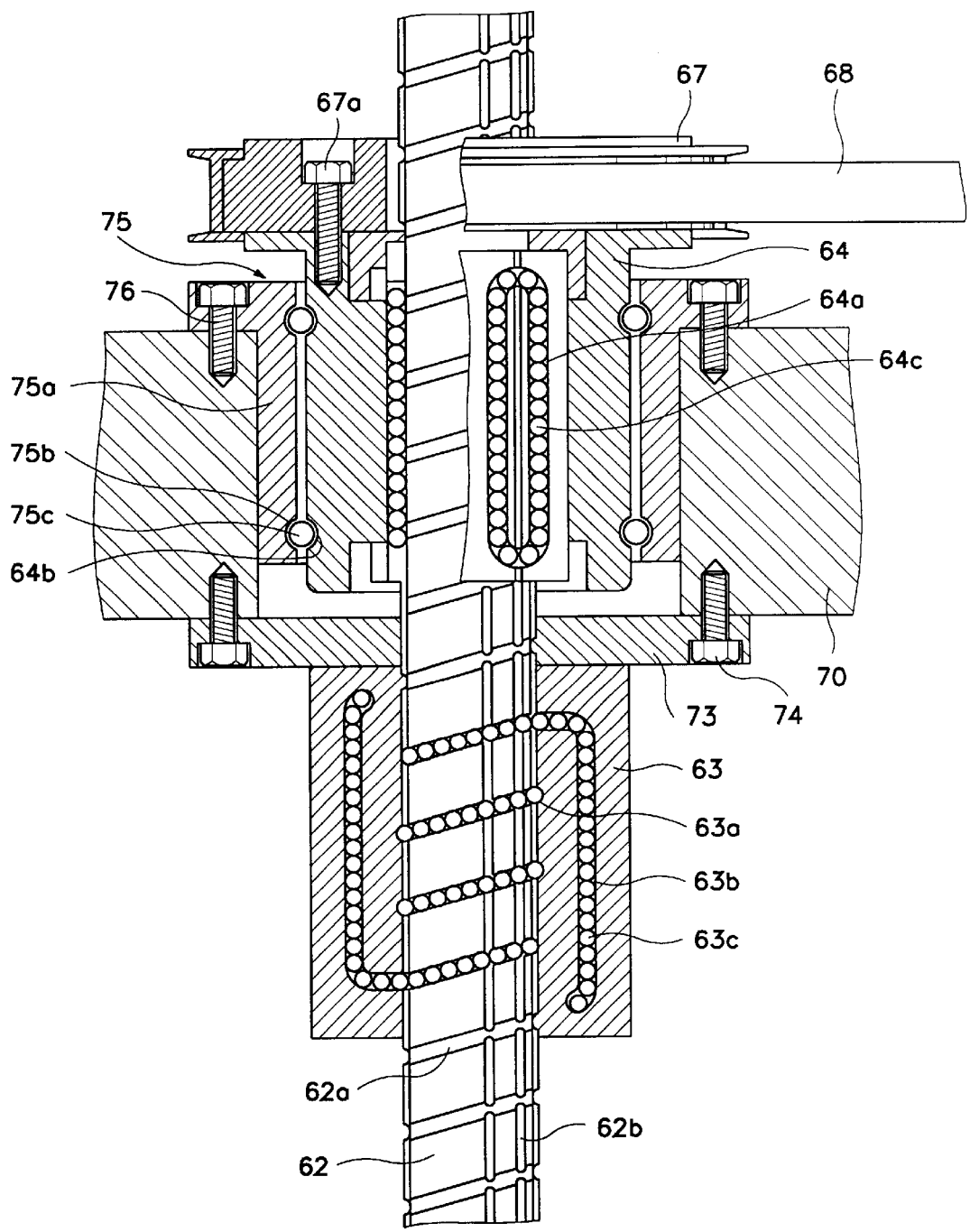
FIG. 3 is a sectional view of a connection structure of a rotational shaft and a movable plate of a telescopic system according to a preferred embodiment of the present invention.

Describing more in detail with reference to FIG. 3, the screw nut 63 is mounted to be ascendable and descendable together with the movable plate 70 along the rotational shaft 62. To realize this, a radial flange 73 is disposed on a top of the screw nut 63, and the radial flange 73 is coupled to the movable plate 70 by screws 74, thereby coupling the screw nut 63 on a bottom of the movable plate 70. The screw nut 63 is provided, at its inner circumference, with a spiral groove 63a corresponding to the spiral groove 62a of the rotational shaft 62. Ball receiving holes 63b extending from opposite ends of the spiral groove 63a are provided in the screw nut 63. A plurality of balls 63c is disposed in a space defined by the spiral grooves 62a and 63a and the ball receiving holes 63b to enhance the smooth movement of the screw nut 63. Accordingly, when the rotational shaft 62 rotates, the screw nut 63 ascends and descends together with the movable plate 70 along the spiral groove 62a of the rotational shaft 62 while the rotational movement of the screw nut 63 is restricted through its coupling to the movable plate 70.

In addition, when the rotational shaft 62 rotates, the spline nut 64 rotates therewith, while ascending and descending together with the movable plate 70. To realize this, a bearing 75 is disposed around the spline nut 64. The bearing 75 includes a housing 75a disposed around the spline nut 64 and coupled to the movable plate 70 by screws 76 and bearing balls 75c disposed between the housing 75a and the spline nut 64. The bearing balls 75c are received between first bearing grooves 75b formed on an inner circumference of the housing 75a and second bearing grooves 64b formed on an outer circumference of the spline nut 64.

The spline nut 64 is provided at its inner circumference with a ball receiving groove 64a corresponding to the linear groove 62b of the rotational shaft 62. A plurality of balls 64c is disposed in the ball receiving groove 64a so that the spline nut 64 can smoothly ascend and descend along the groove 62b and rotate together with the rotational shaft 62 while being restricted in its rotation relative to the rotational shaft 62.

Coupled on a top of the spline nut 64 by bolts 67a is a rotational power transmitting pulley 67 ascending and descending while rotating together with the spline nut 64.

Referring again to FIG. 2, A first movable module 80 is disposed above the movable plate 70 of the stationary module 60 such that the first movable module 80 can ascend and descend together with the movable plate 70 of the stationary module 60. That is, the first movable module 80 is disposed to be movable relative to the stationary module 60. The upper plate 61a is provided with an opening 61d through which the first movable module 80 passes.

The first movable module 80 comprises a case 81 defined by an upper plate 81a and a barrel 81c inserted into the opening 61d of the upper plate 61a of the stationary module 60, and a supporting body 85 mounted on the movable plate 70 of the stationary module 60. Disposed between the upper plate 81a of the first movable module 80 and the movable plate 70 of the stationary module 60 is a movable plate 90 of the first movable module 80. A rotational shaft 82 is disposed penetrating through the movable plate 90 such that the movable plate 90 ascends and descends along the rotational shaft 82. A structure of the movable plate 90 and the rotational shaft 82 of the first movable module 80 is identical to that of the movable plate 70 and the rotational shaft 62 of the stationary module 60. That is, an upper end of the rotational shaft 82 is rotatably supported on the upper plate 81a by a bearing 89, and a lower end thereof is rotatably supported in the support body 85 by a bearing 85a. In addition, mounted on a lower end of the rotational shaft 82 is a rotational force receiving pulley 86 connected by a timing belt 68 to a rotational force transmitting pulley 67 mounted on the rotational shaft 62 of the stationary module 60. The supporting body 85 of the first movable module 80 is provided with a space 85b for receiving the rotational force receiving pulley 86 around which the timing belt 68 is wound.

A lower end of the barrel 81c of the first movable module 80 is spaced away from the movable plate 70 so that the timing belt 68 can be received within the case 81 of the first movable module 80.

The rotational shaft 82 of the first movable module 80 is provided at its outer circumference with a spiral groove 82a and a linear groove 82b. Mounted on the movable plate 90 are a screw nut 83 associated with the spiral groove 82a and a spline nut 84 coupled to the linear groove 82b. A rotational force transmitting pulley 87 is coupled to the spline nut 84, the description of which will be omitted herewith as the coupling structure thereof is identical to that of the stationary module 60.

A second movable module 100 may be further coupled to the first movable module in the same manner as the coupling structure of the first movable module 80 and the stationary module 60, and a third movable module (not shown) may be further coupled to the second movable module 100 also in the same manner as the coupling structure of the first movable module 80 and the stationary module 60. That is, a plurality of movable modules 100 can be coupled to each other to be expandable from and retractable to each other. A work tool (not shown) such as a chuck is mounted on an uppermost module so as to move a predetermined location while the modules expand and retract.

Figure 4:
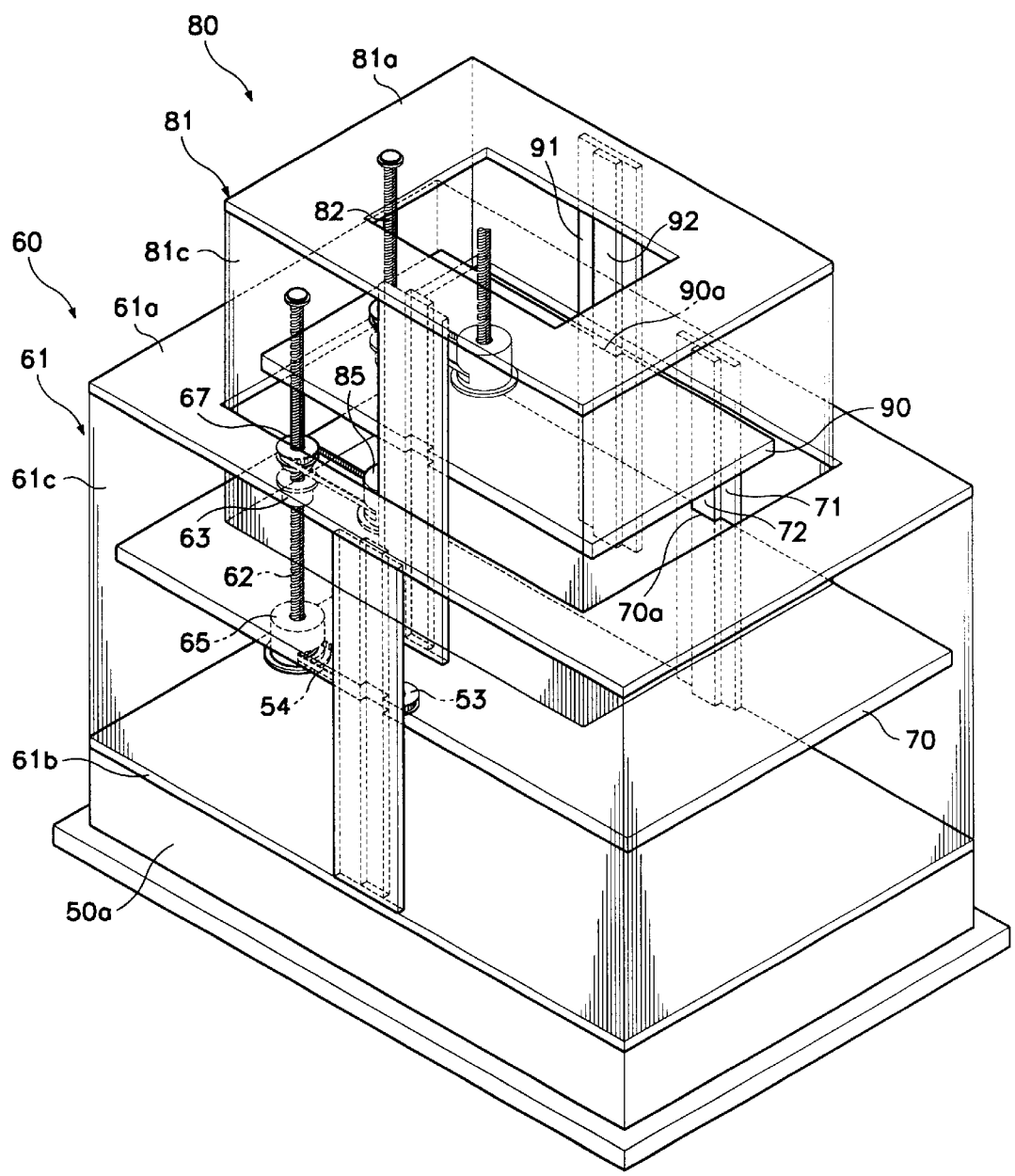
FIG. 4 is a perspective view of a telescopic system for a robot depicted in FIG. 2.

Referring to FIG. 4, a plurality of blocks 71 are vertically disposed between the upper and lower plates 61a and 61b to support the upper plate 61a. Each of the blocks 71 is provided with a projected rail 72 formed along a longitudinal axis thereof, and the movable plate 70 is provided with guide grooves 70a receiving the projected rails 72 of the blocks 71 such that the movable plate 70 can be guided by the rail 72.

In addition, a plurality of blocks 91 is also vertically disposed between the movable plate 70 of the stationary module 60 and the upper plate 81a of the first movable plate 80 to support the upper plate 81a. Each of the blocks 91 is provided with a projected rail 92 formed along a longitudinal axis thereof, and a movable plate 90 is provided with guide grooves 90a receiving the projected rails 92 such that the movable plate 90 can be guided by the rail 92.

The operation of the above described telescopic system for a robot will be described more in detail hereinafter.

When the motor 51 is operated in a direction where the stroke of the telescopic system is increased, the drive pulley 53 mounted on the driving shaft 52 rotates such that the driven pulley 66 connected to the driving pulley 53 by the timing belt 54 rotates. Accordingly, the rotational shaft 62 of the stationary module 60 rotates, and the screw nut 63 coupled to the rotational shaft 62 ascends along the spiral groove 62a in a state where the rotational movement thereof is restricted by the coupling of the screw nut 63 and the movable plate 70. As the movable plate 70 ascends by the screw nut 63, the first movable module 80 moves away from the stationary module 60.

In addition, the spline nut 64 coupled to the linear groove 62b of the rotational shaft 6 and rotatably supported on the movable plate 70 of the stationary module 60 ascends together with the movable plate 70 and rotates together with the rotational shaft 62. Accordingly, the rotational force transmitting pulley 67 coupled to the spline nut 64 also rotates to transmit the rotational force to the rotational force receiving pulley 86 of the first movable module 80. As a result, the rotational shaft 82 of the first movable module 80 ascends together with the movable plate 70 of the stationary module 60, and at the same time, rotates by the rotational force transmitted to the rotational force receiving pulley 86. The rotational force of the rotational shaft 82 of the first movable module 80 acts on the movable plate 90 so that the movable plate 90 ascends through the screw nut 83, and further acts on the second movable module 100 through the spline nut 84 and the rotational force transmitting pulley 87 so that the second movable module 100 ascends.

The operation for reducing the stroke of the telescopic system is performed in reverse to that described above, the detailed description of which will be omitted herein. When the stroke of the telescopic system is reduced to its maximum position, the size of the system can be minimized.

Although a preferred embodiment of the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:
1. A telescopic system for a robot, comprising:
   a stationary module having a motor connected thereto, wherein the stationary module comprises upper and lower plates;
   a rotational shaft rotated by the motor, the rotational shaft being mounted in the stationary module, wherein the rotational shaft comprises an upper end rotatably supported on the upper plate of the stationary module and a lower end;

a movable plate located in the stationary module and operatively associated with the rotational shaft to ascend and descend according to a direction of rotational motion of the rotational shaft; and a movable module mounted on the movable plate to extend away from and retract into the stationary module as the movable plate ascends and descends; and wherein a supporting body is mounted on the lower plate of the stationary module in which the lower end of the rotational shaft is rotatably supported.

2. The telescopic system of claim 1:

wherein the rotational shaft includes a spiral groove; and wherein the movable plate has a screw nut associated with the spiral groove of the rotational shaft to ascend and descend as the rotational shaft rotates.

3. The telescopic system of claim 2:

wherein the screw nut includes, at an inner circumference thereof, a spiral groove corresponding to the spiral groove of the rotational shaft, and wherein a plurality of balls are disposed within a space defined by the spiral groove of the screw nut and the spiral groove of the rotational shaft.

4. The telescopic system of claim 1:

wherein a plurality of vertical blocks are disposed between the upper and lower plates to support the upper plate;

wherein each block includes a projected rail; and wherein the movable plate of the stationary module includes a guide groove associated with the rail such that the movable plate is guided by the projected rail when ascending and descending.

5. The telescopic system of claim 1:

wherein the motor comprises a driving shaft and a driving pulley which is mounted on the driving shaft, wherein the rotational shaft comprises a driven pulley, and wherein a belt interconnects the driving pulley and the driven pulley.

6. The telescopic system of claim 1:

wherein a rotational force transmitting pulley is mounted on the rotational shaft of the stationary module such that the rotational force transmitting pulley ascends and descends together with the movable plate and rotates together with the rotational shaft;

wherein the movable module comprises
 a rotational shaft,
 a rotational force receiving pulley mounted on the rotational shaft,
 a belt connecting the rotational force transmitting pulley and the rotational force receiving pulley, and
 a movable plate mounted on the rotational shaft to ascend and descend as the rotational shaft of the movable module rotates; and wherein a sub-movable module is mounted on the movable plate of the movable module to extend away from and retract into the movable module as the movable plate of the movable module ascends and descends.

7. The telescopic system of claim 6:

wherein the rotational shaft of the stationary module includes a linear groove, and a spline nut associated with the linear groove and supported on the movable plate of the stationary module; and wherein the rotational force transmitting pulley is fixedly coupled to the spline nut.

8. The telescopic system of claim 7:

wherein the spline nut includes a ball receiving groove corresponding to the linear groove, and wherein a plurality of balls are received in a space defined by the ball receiving groove and the linear groove.

9. The telescopic system of claim 6:

wherein the movable module comprises an upper plate on which the rotational shaft of the movable module is rotatably supported;

wherein a plurality of blocks are disposed between the movable plate of the stationary module and the upper plate of the movable plate to support the upper plate of the movable module;

wherein each of the block includes a projected rail; and wherein the movable plate of the movable module include a guide groove associated with the rail such that the movable plate is guided by the projected rail when ascending and descending.

10. A telescopic system for a robot, comprising:

a first stationary module including upper and lower plates;

a motor associated with the first stationary module;

a first rotational shaft in the first stationary module, the first rotational shaft including an upper end rotatably supported on the upper plate and a lower end;

a first coupling means for coupling the motor to the first rotational shaft to rotate the first rotational shaft in the first stationary module, the first coupling means including a supporting body mounted on the lower plate in which the lower end of the first rotational shaft is rotatably supported;

a second movable module telescopically received in the first stationary module;

a second rotational shaft in the second movable module;

a second coupling means (a) for coupling the first rotational shaft to the second movable module such that the second movable module and the second coupling means ascend and descend together according to a rotational direction of the first rotational shaft and (b) for coupling the rotational movement of the first rotational shaft to the second rotational shaft;

a third movable module telescopically received in the second movable module;

a third coupling means (a) for coupling the second rotational shaft to the third movable module such that the third movable module and the third coupling means ascend and descend together according to a rotational direction of the second rotational shaft.

11. The telescopic system of claim 10:

wherein the second coupling means includes a rotational force transmitting pulley mounted for rotation with the first rotational shaft and for axial movement along the first rotational shaft, a rotational force receiving pulley mounted for rotation with the second rotational shaft, a belt interconnecting the force transmitting and receiving pulleys, and a movable member mounted for non-rotation on the first rotational shaft and connected to the second movable module so as to ascend and descend as the first rotational shaft is rotated and hence to similarly move the second movable module connected thereto.

* * * * *